Dec. 27, 1949  F. LEVY  2,492,364
SELF-LOADING VEHICLE

Filed July 17, 1947  2 Sheets-Sheet 1

INVENTOR.
Felix Levy
BY

Dec. 27, 1949     F. LEVY     2,492,364
SELF-LOADING VEHICLE

Filed July 17, 1947     2 Sheets-Sheet 2

INVENTOR.
Felix Levy
BY

Patented Dec. 27, 1949

2,492,364

UNITED STATES PATENT OFFICE 2,492,364

SELF-LOADING VEHICLE

Felix Levy, Cagnes-sur-Mer, France

Application July 17, 1947, Serial No. 761,510
In France July 23, 1946

6 Claims. (Cl. 214—81)

My invention relates to a device for the loading of vehicles.

A first object of my invention is to provide a device which will permit automatic loading of a vehicle, and more particularly of a road vehicle, such as a truck, without requiring any auxiliary machine or manual labour.

Another object of my invention is a device comprising a load-supporting base carried by sectors pivoted transversely of the vehicle at one end thereof and in contact with the ground, in such a manner that the said sectors are caused to roll on the ground when the vehicle moves, whereby the base is raised and brought to the level of the floor of the vehicle.

A further object of my invention is a device of the kind above mentioned, wherein the sectors are pressed unto the ground by spring means.

The load supporting base may vary in shape in accordance with the objects to be loaded. When it is desired to load boxes, chests or the like, the base may be in the form of a flat plate whereon the load is brought, while for barrels the base may be more or less arcuate in cross-section.

When the sectors roll on the ground, the base rotates about their pivot and the load tends to roll towards the vehicle. Means are therefore generally provided to prevent the load from falling between the base and the end of the vehicle, although in some cases the said means may be formed by the edges of the sectors themselves or by the edge of the vehicle floor.

Figure 1:
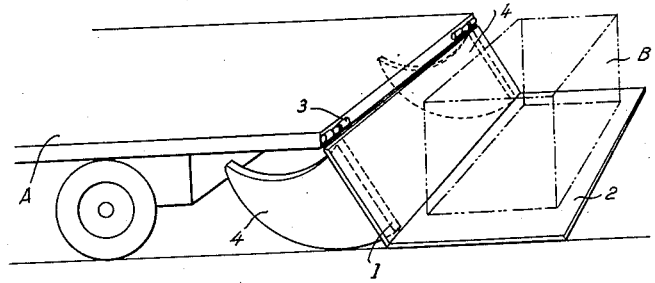
Fig. 1 is a fragmental perspective view showing the rear of a vehicle provided with a device in accordance with my invention, the load-supporting base being shown at its lowermost position.
Figure 2:
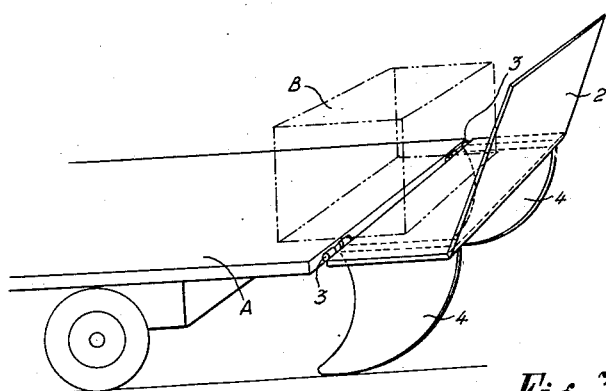
Fig. 2 is a view similar to Fig. 1, but showing the base at the raised position.

In the construction diagrammatically illustrated in Figs. 1 and 2, the device comprises a pair of plates 1 and 2, for example made of sheet iron, disposed at an angle with respect to one another to form a rigid unit which is hinged at 3 along the rear edge of the floor A of a truck. The arrangement is such that plate 2 may rest substantially horizontally on the ground, as shown in Fig. 1, to form a flat load-supporting base adapted to receive the load to be loaded on the truck, for instance a chest B.

A sector 4 is disposed each side of plate 1, in a vertical longitudinal plane. Sectors 4 are coaxial with hinges 3 and their radius is such that they are in contact with the ground.

It will be understood that when the device is at the position illustrated in Fig. 1, the load B is easily brought on plate 2 which rests horizontally on the ground. If now the truck moves ahead, sectors 4 will roll on the ground, whereby base 2 will be raised. The load B will rock from base 2 unto plate 1 while the latter will progressively reach a horizontal position at the level of floor A, as shown in Fig. 2. It is then easy to transfer the load from plate 1 to floor A.

Abutments may be provided to stop rotation of sectors 4 when plate 1 is horizontal.

By moving the truck rearwardly the device is again brought to the position of Fig. 1 to deal with another load.

It will easily be understood that the same device may be used for unloading the vehicle. The device being first brought to the position of Fig. 2, the load is pushed on plate 1 and the truck is moved backwards, whereby the load rocks unto base 1, while the latter progressively comes unto the ground (Fig. 1).

During running the device is raised above the position of Fig. 2 and it is retained by any appropriate means. Base 2 may be foldable against plate 1 and sectors 4 could be removable. The whole unit may also be removed from the vehicle.

Figure 3:
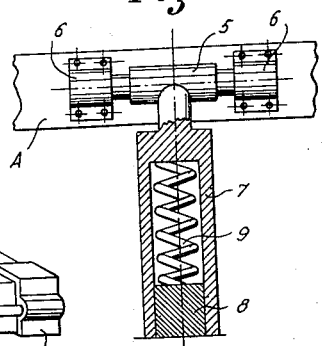
Fig. 3 is a partial longitudinal section showing an elastic device to urge the sectors against the ground.

Of course proper operation requires that sectors 4 bear on the ground with sufficient pressure to avoid slip. This is easily obtained with relatively light vehicles having very resilient suspension springs and on an even ground. When such is not the case, means may be provided to elastically press the said sectors against the ground. Fig. 3 shows an embodiment of such means:

A hinge 5, rotatably carried by bearings 6, is in one with a cylinder 7 housing a piston 8 urged downwardly by a spring 9. Piston 8 is mechanically connected with a sector 4 of Figs. 1 and 2. It will be understood that in this manner the sectors may be regularly pressed against the ground irrespective of the variations in height of the vehicle floor or of the unevenness of the ground.

Figure 4:
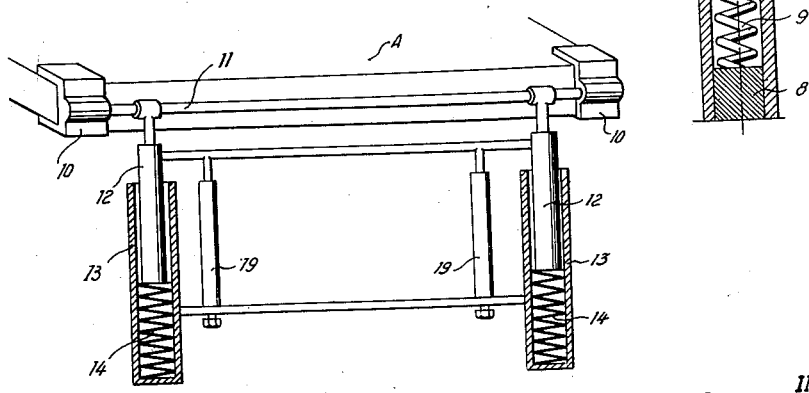
Fig. 4 is a rear view, with parts in section, showing a modified construction.
Figure 5:
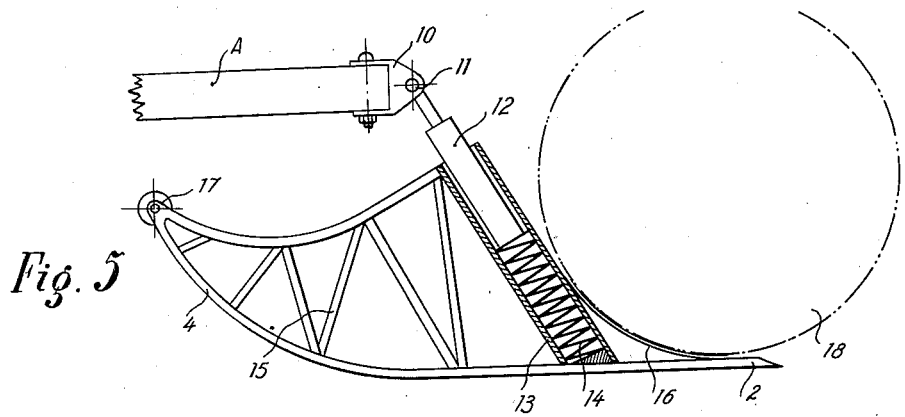
Fig. 5 is the corresponding side view.

In the embodiment of Figs. 4 and 5 there is used a device somewhat similar to Fig. 3. Bearings 10 fixed to the rear of the vehicle A carry a rotatable shaft 11 whereon there are radially secured pistons 12 slidable in cylinders 13 provided with springs 14. Cylinders 13 are in one with structures comprising arcuate members 4 terminating rectilinearly at the rear, as indicated at 2, such members being re-inforced by parts such as 15 forming a kind of framework. An arcuate member 16 is disposed as indicated to receive a cylindrical load, such as a barrel 18. The fore ends of members 4 are connected with each other by a roller 17.

Members 4 operate as the sectors of Figs. 1 and 2, while member 16 together with the rear end 2 of members 4 forms a load-supporting base.

The operation remains the same as in Figs. 1 and 2, but if the vehicle goes on moving forward after the load has reached the level of floor A, roller 17 comes into contact with the ground and rolls thereon.

The device illustrated in Figs. 4 and 5 also comprises tensioning means 19 adapted to move cylinders 13 and pistons 12 against the action of springs 14, in order to permit of easily disposing the frame on the ground without having to move the vehicle backwards. When this is effected, devices 19 are loosened to permit operation of springs 14.

It will be understood that members 4 and cylinders 13 form a rigid unit elastically connected with the vehicle and regularly pressed against the ground.

Figure 6:
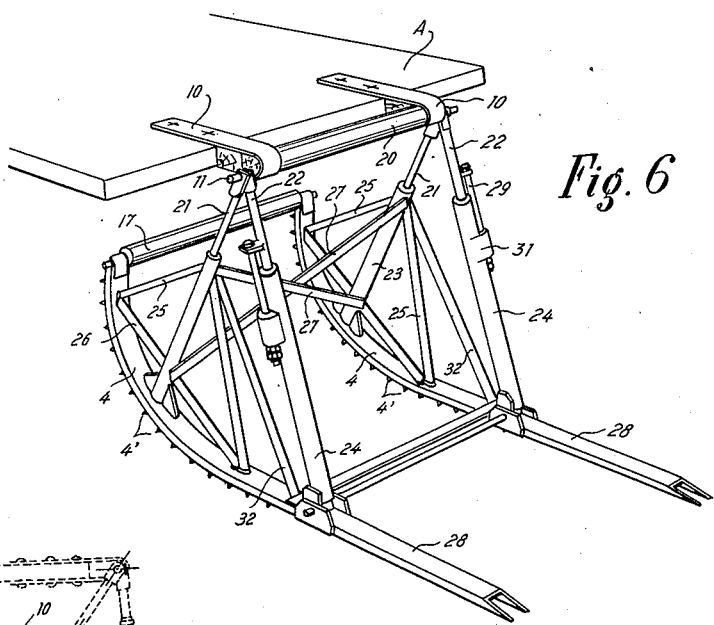
Fig. 6 is a perspective view of another modification.
Figure 7:
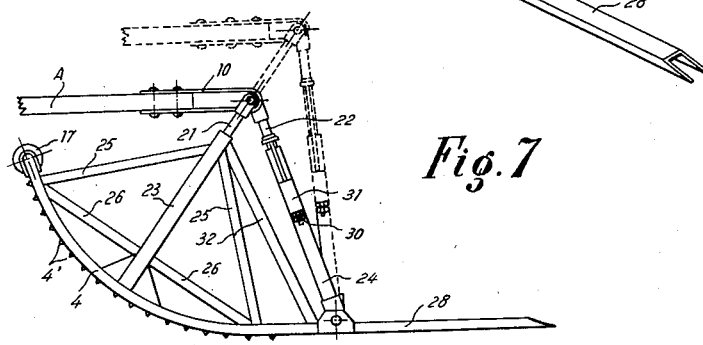
Fig. 7 is the corresponding side view.

In the embodiment of Figs. 6 and 7 bearings 10 are in the form of U-shaped irons securing a transverse tube 20 which carries the rotatable shaft 11. The latter is provided at both ends with radial rods 21 and 22. Rods 21 are slidable within cylinders 23 housing springs similar to springs 13 of Figs. 4 and 5. Rods 22 are also slidable within cylinders 24, but the latter have no internal springs.

Cylinders 23 are rigidly secured to the arcuate members or sectors 4 each side of the device, stays 25 and 26 being provided to avoid any deformation in the longitudinal plane, while transverse bars 27 form a rigid X-shaped re-inforcement in the transverse plane. In this manner the whole unit forms a rigid framework.

Cylinders 24 are on the contrary articulated at their lower end to a load-supporting frame 28 which forms a rearward extension of members 4. A threaded rod 29, provided with end nuts 30, is laterally fixed by one end to rods 22 while its other end slides through a guide 31 carried by the corresponding cylinder 24. Rods 29 limit the stroke of rods 22 and prevent same from becoming disengaged from cylinders 24.

The device also embodies a front roller 17 as in the case of Figs. 4 and 5 and the obliquity of rods 22 is such that they are slightly inclined towards the floor A of the vehicle when roller 17 comes into contact with the ground. At the lower position of the load-supporting base or frame 28, roller 17 is materially below the level of floor A (for instance 25 to 35 centimeters).

Additional stays 32 may be provided to re-inforce the framework in the vicinity of the articulation of cylinders 24. Members 4 are preferably provided with projections 4' which co-act with the springs of cylinders 23 to prevent slip.

It will be understood that the above description does not limit the scope of the present invention. For instance, in the case of Figs. 6 and 7 cylinders 23 and 24 could be secured to shaft 11 while rods 21 and 22 would be fixed or articulated to the framework. Means could be provided in cylinders 23 to permit adjustment of the inner springs.

I claim:

1. An automatic loading device for vehicle platforms, comprising at least one vertical sector shaped member adapted to rest on the ground, a spindle arranged transversally of the rear of the vehicle platform in an unvarying position with reference thereto and to which the sector is secured for rotation round the axis of the spindle, yielding means inserted between the horizontal spindle and the sector for urging the latter against the ground and assisting the adherence required for transforming the longitudinal movement of the vehicle into a pivoting movement of the sector and a flat extension of the sector towards the rear thereof adapted to carry the load to be lifted by the forward progression of the vehicle and consequent pivoting of the sector.

2. An automatic loading device for platform vehicles comprising at least one arcuate shoe adapted to lie in a vertical plane parallel to the longitudinal axis of the vehicle and to roll on the ground, a rearward flat extension for said arcuate shoe adapted to carry the load and to raise same when the shoe rolls over the ground, a horizontal spindle arranged transversally of the vehicle platform to the rear thereof, means secured to the platform and pivotally holding said spindle in an unvarying position at the rear of the platform, two rods of adjustable length connecting radially the shaft respectively with the rearmost end of each shoe and a point of said shoe to the front of said rearmost end and struts ensuring the rigidity of the assembly of the rods and shoe.

3. An automatic loading device for platform vehicles comprising at least one arcuate shoe adapted to lie in a vertical plane parallel to the longitudinal axis of the vehicle and to roll on the ground, a rearward flat extension for said arcuate shoe adapted to carry the load and to raise same when the shoe rolls over the ground, a horizontal spindle arranged transversally of the vehicle platform to the rear thereof, means secured to the platform and pivotally holding said spindle in an unvarying position at the rear of the platform, two inner rod elements radially secured to the spindle at each end thereof, outer rod elements radially secured to parts of each shoe that are distant from one another and in longitudinal sliding engagement with reference to the corresponding inner rod elements and means for limiting the relative sliding motion between the cooperating inner and outer rods.

4. An automatic loading device for platform vehicles comprising at least one arcuate shoe adapted to lie in a vertical plane parallel to the longitudinal axis of the vehicle and to roll on the ground, a rearward flat extension for said arcuate shoe adapted to carry the load and to raise same when the shoe rolls over the ground, a horizontal spindle arranged transversally of the vehicle platform to the rear thereof, means secured to the platform and pivotally holding said spindle in an unvarying position at the rear of the platform, two inner rod elements radially secured to the spindle at each end thereof, outer rod elements radially secured to parts of each shoe that are distant from one another and in longitudinal sliding engagement with reference to the corresponding inner rod elements, the foremost outer rod element being rigid with the shoe and the rearmost outer rod element pivotally connected to the rearmost end of the shoe, means for adjustably securing the rearmost inner and outer elements in the desired relative position thereof and a spring urging apart the foremost rod elements against collapse.

5. An automatic loading device for platform vehicles comprising at least one arcuate shoe adapted to lie in a vertical plane parallel to the longitudinal axis of the vehicle and to roll on the ground, a rearward flat extension for said arcuate shoe adapted to carry the load and to raise same when the shoe rolls over the ground, a horizontal spindle arranged transversally of the vehicle platform to the rear thereof, means secured to the platform and pivotally holding said spindle in an unvarying position at the rear of the platform, two inner rod elements radially secured to the spindle at each end thereof, outer rod elements radially secured to parts of each shoe that are distant from one another and in longitudinal sliding engagement with reference to the corresponding inner rod elements, the foremost outer rod element being rigid with the shoe and the rearmost outer rod element pivotally connected to the rearmost end of the shoe, means for adjustably securing the rearmost inner and outer elements in the desired relative longitudinal position thereof, and a spring urging apart the foremost rod elements against collapse, struts connecting the shoes with one another and with the inner end of at least one outer rod element.

6. An automatic loading device for vehicle platforms, comprising at least one vertical sector shaped member adapted to rest on the ground, a spindle arranged transversally of the rear of the vehicle platform in an unvarying position with reference thereto and to which the sector is secured for rotation round the axis of the spindle, yielding means inserted between the horizontal spindle and the sector for urging the latter against the ground and assisting the adherence required for transforming the longitudinal movement of the vehicle into a pivoting movement of the sector and a flat extension of the sector towards the rear thereof adapted to carry the load to be lifted by the forward progression of the vehicle and consequent pivoting of the sector and a roller at the front end of the sector adapted to engage the underside of the vehicle platform when the latter is in its loading position with the load carrying extension on the ground.

FELIX LEVY.

REFERENCES CITED

The following references are of record in the file of this patent:

UNITED STATES PATENTS

| Number | Name | Date |
| --- | --- | --- |
| 1,467,504 | Sabarros | Sept. 11, 1923 |

FOREIGN PATENTS

| Number | Country | Date |
| --- | --- | --- |
| 27,548 | France | Mar. 18, 1924 |
| | (Addition to No. 550,418) | |
| 28,662 | France | Dec. 15, 1924 |
| | (Addition to No. 550,418) | |